United States Patent
Syed et al.

(10) Patent No.: US 11,157,559 B2
(45) Date of Patent: Oct. 26, 2021

(54) METHOD, APPARATUS, AND COMPUTER-READABLE MEDIUM FOR DATA ASSET RANKING

(71) Applicant: Informatica LLC, Redwood City, CA (US)

(72) Inventors: Awez Syed, San Jose, CA (US); Gaurav Pathak, Bangalore (IN)

(73) Assignee: INFORMATICA LLC, Redwood City, CA (US)

(*) Notice: Subject to any disclaimer, the term of this patent is extended or adjusted under 35 U.S.C. 154(b) by 165 days.

(21) Appl. No.: 16/654,603

(22) Filed: Oct. 16, 2019

(65) Prior Publication Data

US 2021/0117474 A1    Apr. 22, 2021

(51) Int. Cl.
| | |
|---|---|
| *G06F 16/00* | (2019.01) |
| *G06F 16/901* | (2019.01) |
| *G06F 16/903* | (2019.01) |
| *G06F 16/9038* | (2019.01) |
| *G06F 16/9035* | (2019.01) |
| *G06F 16/2457* | (2019.01) |

(52) U.S. Cl.
CPC ...... *G06F 16/902* (2019.01); *G06F 16/24578* (2019.01); *G06F 16/9035* (2019.01); *G06F 16/9038* (2019.01); *G06F 16/90348* (2019.01)

(58) Field of Classification Search
CPC .................................................. G06F 16/24578
See application file for complete search history.

(56) References Cited

U.S. PATENT DOCUMENTS

2008/0243815 A1* 10/2008 Chan ................. G06Q 30/0641
2018/0130019 A1*  5/2018 Kolb .................. G06F 16/9024

OTHER PUBLICATIONS

"The PageRank Citation Ranking: Bringing Order to the Web", Jan. 29, 1998, pp. 1-17.

* cited by examiner

*Primary Examiner* — Ajith Jacob
(74) *Attorney, Agent, or Firm* — Amardeep S. Grewal; Richard A. Graham, Jr.; Reed Smith LLP

(57) ABSTRACT

Systems, methods, and related techniques and apparatus containing instructions which when executed by one or more computing devices for determining dataset rankings by determining a lineage ordering requirement for a collection of datasets; determining, from the lineage order requirement, one or more first lineage level datasets from the collection of datasets; generating one or more first lineage level asset ranks respectively for each one of the one or more first lineage level datasets, determining at least one second lineage level dataset having an outflow to the one or more first lineage level datasets; and generating a first dataset rank for the at least one second lineage level dataset as a first function of the outflow and at least one of the one or more first lineage level asset ranks.

20 Claims, 14 Drawing Sheets

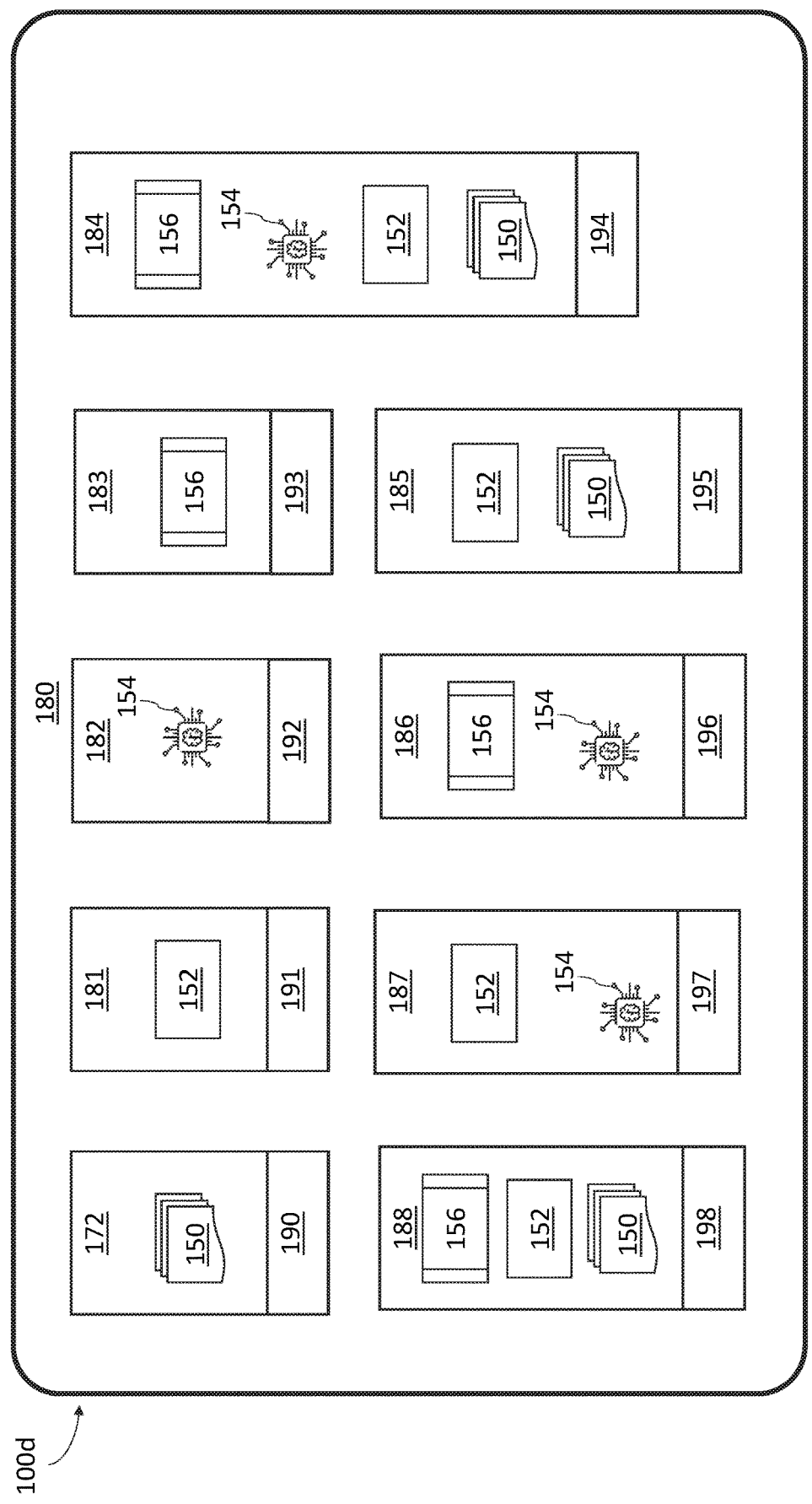

METHOD, APPARATUS, AND COMPUTER-READABLE MEDIUM FOR DATA ASSET RANKING

FIELD

This disclosure is generally related to data analytics and data informatics, and in particular to automated data cataloguing.

BACKGROUND

In the modern economy, data collections are often the most valuable asset a firm may possess. Many highly valuable data collections store extremely large amounts of data, in many disparate physical data storage facilities, each containing numerous separate and distinct data stores, which themselves contain large amounts of data in various forms, such as files, relational databases, hierarchical databases, non-relational databases. Data storage facilities, such as servers may themselves be organized into high availability configurations such that data is duplicated across multiple physical separate data storage facilities, which themselves may be geographically remote from one another. A firm's data collection may be interconnected by a network, itself interconnected with a number of application servers and workstations running applications that interact with, operate on, and retrieve data from the firm's data collection by interacting with, operating on, and retrieving data from specific individual files, specific databases, or specific datasets, such as database tables, specific database table columns, hierarchies, sub-hierarchies, non-relational data units, or other individual data storage units. An application may so draw upon many different datasets stored within a data collection's data storage facilities.

Data use trends indicate that the more data a firm can collect and make efficient use of the better is its ability to conduct operations, the better the firm is able to support its customers and clients. Firms are expending large amounts of resources and time to analyze and understand their data. The practice of data informatics, such as implementing secure digital asset management systems, managing and preserving electronic records, and developing user-centered data structures in a networked environment, requires highly accurate data analytic capabilities to understand trends and patterns in a firm's data. Data analytics in turn requires vast and varied amounts of data to derive meaningful insights into a firm's operations. For accurate analytics it is important to understand which data is most valuable, whether the importance of data is changing over time, whether the importance of data changes with the occurrence of specific events, which data requires the most secure data storage facilities, and which data requires the most highly available data storage facilities. Many firms are now developing and implementing sophisticated machine learning and artificial intelligence techniques to generate predictions about data behaviors and to drive efforts to optimize data storage, data accessibility, data security, and data availability, and the like.

BRIEF DESCRIPTION OF THE DRAWINGS

FIG. 1F illustrates aspects of a data collection in accordance with this disclosure.

DETAILED DESCRIPTION

Figure 1B:
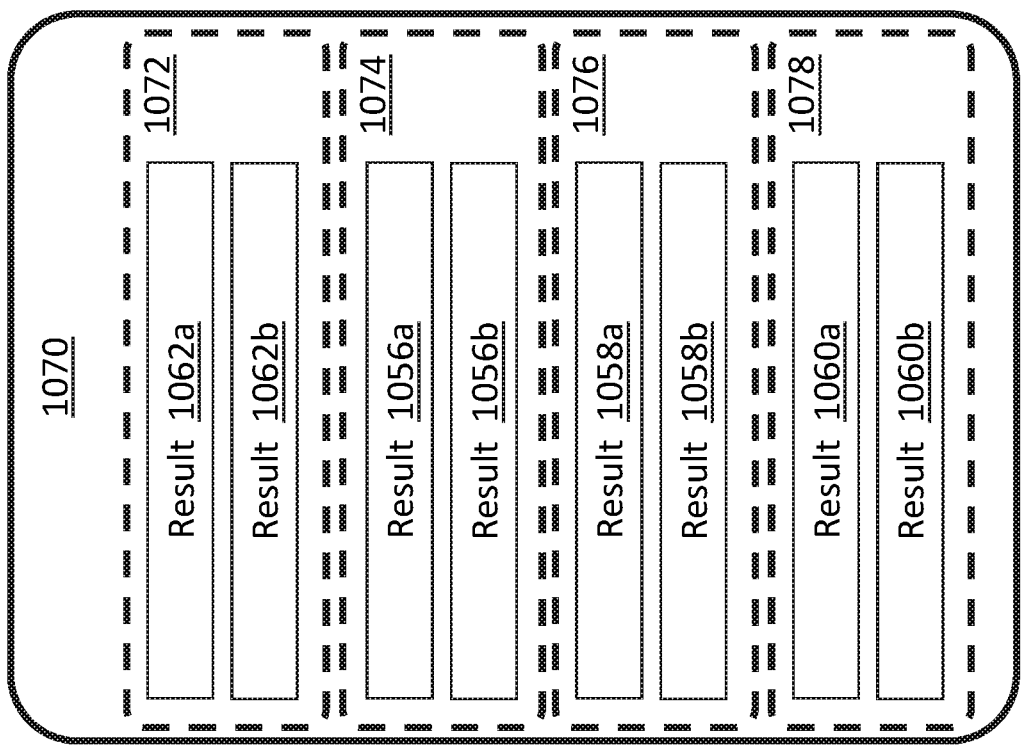
FIG. 1B illustrates aspects of a data collection in accordance with this disclosure.

Disclosed are one or more embodiments that incorporate features of this invention. The disclosed embodiment(s) merely exemplify the invention. The scope of the invention is not limited to the disclosed embodiments. Rather, the invention is defined by the claims hereto.

A data catalog may be created and employed as a tool in support of many technologies and technological techniques for studying, discovering, governing, managing, analyzing, and optimizing a firm's data assets. A properly developed and defined data catalog informs data consumers (e.g., other information systems, and thereby the users of those information systems such as data analysts, data scientists, and data stewards) about a firm's data, including informing data consumers about the relative importance of data and about relevancy of a firm's data to firm operations and to specific data operations within a firm. For example, a data catalog cataloging the data assets of a firm's entire data collection informs catalog users about how important, relevant, or valuable a particular data asset (e.g., a dataset, a database, a data table, a data file, or the like) in a particular data store. In another example, a data catalog cataloging data of a firm's entire data collection informs catalog users about how important, relevant, or valuable a subset of a data collection is to a particular job or operation within a firms overall data system operations. In another example a data catalog may only catalog a portion of a firm's total data collection, for example a data catalog may only catalog a set of all datasets that inform, or form a dependency of, one particular dataset or one particular collection of datasets.

Another particular problem arises in data cataloging technology as a result of the incredible volume of data consumed. For example, a data catalog scans and catalogs hundreds or thousands of databases, file systems, applications and analytical systems. A product of such a data cataloguing system are metadata objects that characterize and describe a data collection's content in machine readable formats and human readable formats. Such cataloguing creates a data catalog that is a metadata repository that can easily include hundreds of millions if not billions of individual metadata objects, which collectively characterize an overall data collection. This volume of information presents significant problems and challenges for data maintenance technologies, data preservation technologies, data optimization technologies, data discovery technologies, data processing optimization technologies, and automated technologies that use such a data catalog, e.g., data system optimization processes for optimizing data accessibility, data storage, data availability, and data security within an overall data processing system having limited resources. Thus, an efficient means for understanding the importance, inter-relationships, and value of specific data assets within a firm is of critical importance to a data catalog, and such a means must be entirely objective and mechanical so that it may be executed and performed by a generic computer processor without human intervention. As disclosed herein, techniques for generating improved data catalogues configured to include an asset rank in accordance with this disclosure provide such an objective and mechanical mechanism, which may be performed by a generic computer processor without human intervention For example, most catalogs provide a dataset search technology to allow users to search for datasets within a data catalog. As used herein, "users" is intended broadly to include any user of data, such as another computer process executing in a downstream application, and by extension users of such applications, like data analysts, data scientists, and the like.

A data catalog often does not include individual data records, rather it includes metadata objects about individual datasets. For example, a dataset search in an appropriate query language may query a data catalog for "all datasets that include information about a firm's customers," whereas a data search in an appropriate query language may query a data collection for: "all information about my customer John Doe." A desirable result to a dataset search may return a list of trusted data sources that contain customer information, whereas a desirable data search will return information specifically about a customer John Doe. Thus, known search querying based on keyword searching is of limited use when performing dataset searching, or more generally data asset searching, where a user (whether a human consumable report, an artificial intelligence process, a machine learning process, or any other information processing system informed by a data catalog) desire a return that includes data relevant to a particular use case, and therefore preferably obtains results ordered by a data asset's relevance to a particular use case.

Figure 1A:
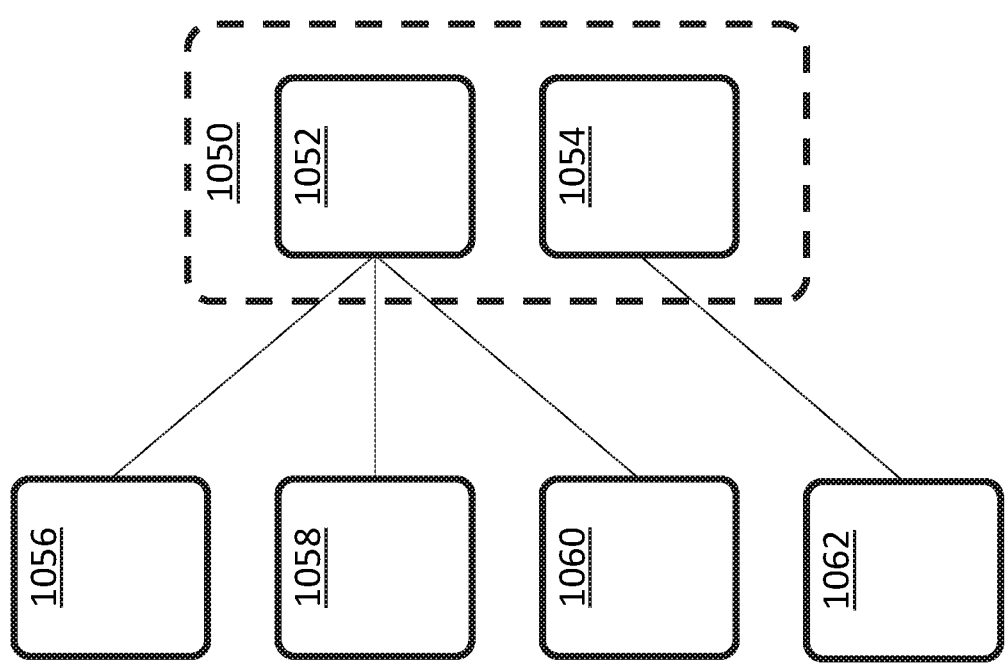
FIG. 1A illustrates aspects of a data collection in accordance with this disclosure.

FIGS. 1A and 1B illustrate aspects of an exemplary embodiment. In an exemplary firm, two human consumable reports 1052 and 1054 are exemplary primary data consumables 1050 within such a firm. These primary data consumables 1050 rely on other data assets of the firm, e.g., datasets 1056, 1058, 1060 and 1062. A data catalog describing the data collection illustrate in FIG. 1A catalogs data from each data set 1052, 1054, 1056, 1058, 1060, 1062. In an exemplary embodiment of a data ranking system, primary data consumables 1050, human consumable reports 1052 and 1054 are related to datasets 1056, 1058, 1060, and 1062 in a lineage relationship such that primary data consumables 1050 are descendants of datasets 1056, 1058, 1060, and 1062, and accordingly datasets 1056, 1058, 1060, and 1062 are ancestors of primary data consumables 1050.

In a lineage relationship the flow of data flows from ancestors, e.g., 1056, 1058, 1060, 1062 to descendants, e.g., 1052, 1054. Each dataset (whether ancestor or descendant) may have a data inflow and/or a data outflow. As illustrated in FIG. 1A, as illustrated, each primary data consumable 1050 has a data inflow and each ancestor has data outflow. Specifically, report 1052 has an inflow of three corresponding to data outflow of ancestors 1056, 1058, and 1060. And report 1054 has an inflow of one corresponding to a data outflow of 1062. In accordance with this disclosure, a data assets' rank is affected by its outflow and its relationship to a primary data consumable 1050, e.g., 1052 or 1054.

One exemplary use of a data asset rank in accordance with this disclosure is to enhance data search capability. Currently, when users of data collections search for data assets within a data catalog, search returns may include all potentially relevant data assets within a data collection without prioritization or weight given to importance or value of data within a use case of a data catalog. In an embodiment, a data asset rank is generated for each dataset in a data collection. Once obtained, data asset rank may be useful for presenting search results, at least in part, based on a data asset rank of a data asset from which a particular search result is obtained. In this way, data asset searches return objects having a higher value or weight within a data catalog.

In an embodiment, exemplary data asset ranking instructions (e.g., as discussed in further detail below in reference to FIG. 3) data asset ranks for datasets 1052, 1054, 1056, 1058, 1060, 1062 are based on data outflows in relation to a primary data consumable 1050. In certain an embodiment in accordance with this disclosure, data asset ranks are generated by a computer processor performing operations to generate data asset ranks of particular datasets in accordance with relationships expressed, for preciseness, as follows:

$$AR(j, v) = \begin{cases} \frac{1}{d}\left(\frac{1}{1+N(1)}\right), & v = 1; \\ \frac{1}{d} \cdot \sum_{k=1}^{N(v-1)} \frac{W(k_{v-1}, j_v) \cdot AR(k_{v-1}, v-1)}{1 + \sum_{i=1}^{N(v)} W(k_{v-1}, i_v)}, & v \neq 1; \end{cases}$$

Where, in relationships in accordance with the above expression:

$AR(j, v)$ = Asset Rank of Data set $j$ in lineage level $v$, $j$ = index of dataset in lineage level $v$ $N(v)$ = Total number of datasets in lineage level $v$ $$W(m, n) = \begin{cases} w, \text{ where } w \text{ is a number of outflow from} \\ \quad \text{dataset } n \text{ in lineage level } v \text{ to dataset} \\ \quad m \text{ in lineage level } v - 1; \\ 0, \text{ no outflow from } n \text{ in lineage level } v \\ \quad \text{to } m \text{ in lineage level } v - 1; \end{cases}$$

$d$ = a damping factor

Thus, data asset ranks in accordance with this disclosure are a function of, or are based on, outflows from each dataset, data asset ranks descendant, and a damping factor, which may be selected such that all results once summed are approximately 1. In a preferred embodiment, d=2.

Thus, in accordance with this disclosure, data asset ranks for each asset shown in FIG. 1A are set forth in Table 1 below.

TABLE 1

| Asset | Asset Rank |
|-------|------------|
| 1052 | 0.16666 |
| 1054 | 0.16666 |
| 1056 | 0.020834 |
| 1058 | 0.020834 |
| 1060 | 0.020834 |
| 1062 | 0.041668 |

Thus data asset 1062 has a highest data asset rank of all ancestor data sets at 0.041668, and primary data consumables 1050 have a highest rank. In an embodiment, search results when searching for specific data assets having specific metadata features (e.g., select all data assets that include a customer name field) will be ordered such that all data sets having such a metadata feature is returned in an ordering based on a data asset rank associated with a data asset from which an object is selected. For example, in the exemplary embodiments discussed above in reference to FIG. 1A, results 1070 of an exemplary search are illustrated in FIG. 1B. Search results 1072, including objects 1062a and 1062b, are presented first in an ordering of results, because results 1072 are selected from data asset 1062 having a highest asset rank of all ancestors of primary data consumables 1050. As illustrated, results 1074, 1076, and 1078, are presented after results 1072, because data assets 1056, 1058, and 1060 have a lower data asset rank than data asset 1060. Thus, results 1056a, 1056a, 1058a, 1058b, 1060a, 1060b, respectively from data assets 1056, 1058, 1060, are presented below 1062a and 1062b in search results 1070. In other exemplary embodiments, data asset rank is one factor used in determining an ordering of a search results. In other exemplary embodiments, data asset rank is the only factor relied upon in determining an ordering of search results. In either case, generating search result ordering is based upon data asset rank. Various interrelated details and interrelated embodiments are discussed in detail in the following.

In an embodiment, a data asset rank may be determined for a specific use case of a data collection having many use cases. A firm's data collection may support multiple technologies in addition to data analytics and data asset searching, and a data asset rank in accordance with this disclosure may enhance such technologies by determining, for a specific technological use case, a data asset ranking to determine a relative value of a data asset with respect to a particular technological use case. In reference to FIG. 1A, data sets 1052 and 1054 establish a use case, and are referred to as use case datasets. In the context of a data collection, a use case may be defined as a set of data asset sources one or more users are directly dependent upon. A lineage of a use case includes a set of all ancestor datasets of each use case dataset.

Figure 1C:
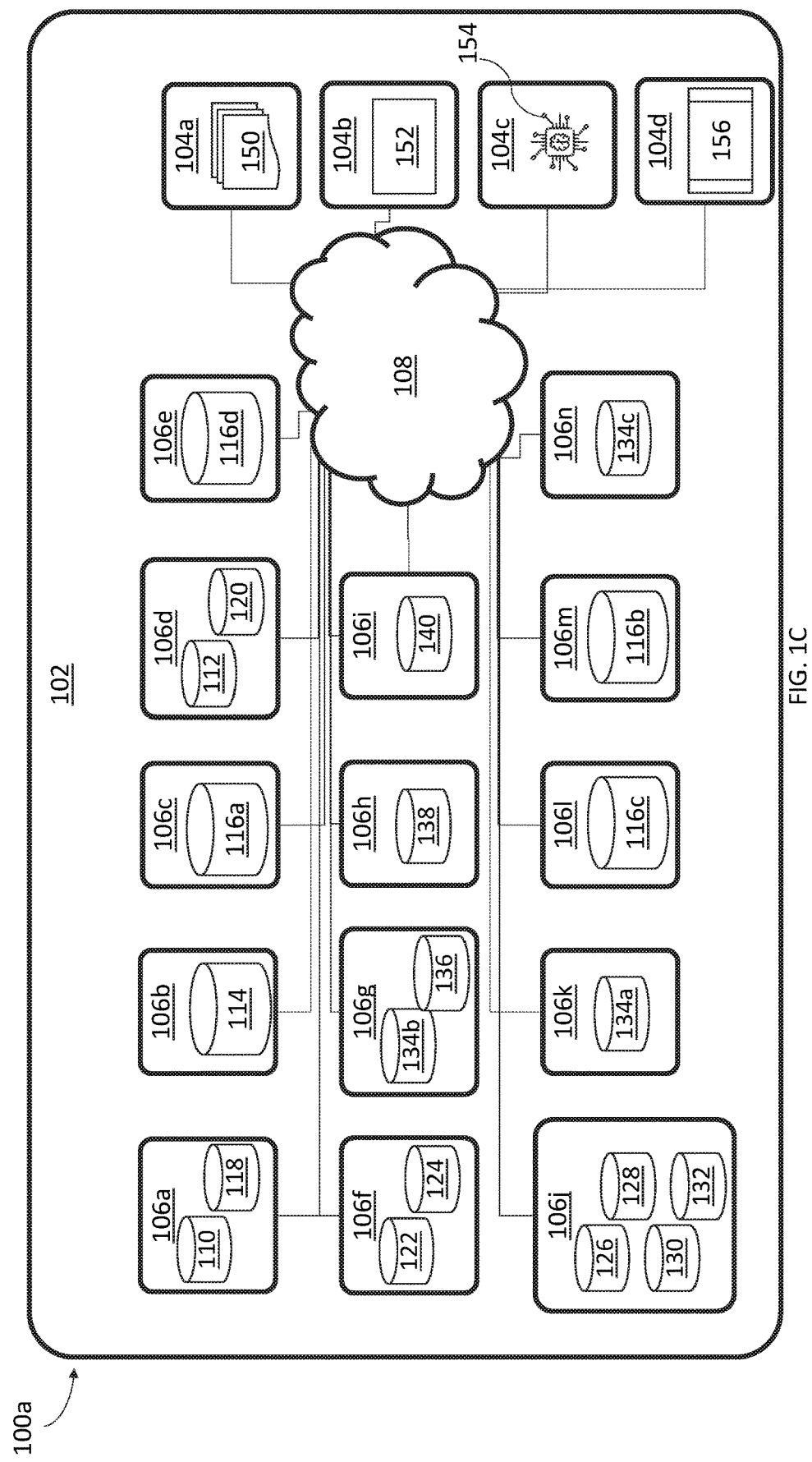
FIG. 1C illustrates aspects of a data collection in accordance with this disclosure.

These principals are perhaps better understood in reference to FIGS. 1C-1F. FIG. 1C illustrates aspects of exemplary data processing resources 100a. These aspects 100 include a data collection 102 and a plurality of operational nodes 104a, 104b, 104c, and 104d communicatively coupled to a plurality of data storage facilities 106a-106n via a network 108. Each data storage facility 106a-106n includes one or more data assets 110, 112, 114, 116, 118, 120, 122, 124, 126, 128, 130, 138, 136, 136, 138, 140, 142, 144, 146, 148. Upon reading this disclosure one will appreciate that data storage facilities 106a-n, or other operational nodes, e.g., 104a-d, may also execute various processes that create, use, and maintain such data assets.

Each data asset may be a distinct data asset, e.g., non-distributed relational database 110, a distributed database 116 comprising distributed components 116a, 116b, 116c, 116d, a document data store 118, a columnar data store 122, a key/value data store 124, a graph data store 126, a time series datastore 128, object data stores 130, external index data stores 132, a highly available data asset including replicated copies 134a, 134b, 134c in physically disparate locations 106k, 106g, 106n, intelligence databases 120. In some embodiments, data assets are stored in cloud based repositories. In general, a data asset, e.g., data asset 136, 138, 140, 142, 144, 146, or 148, may be any suitable type of data store as may be useful to a firm's operations.

A data storage facility may store multiple data assets, e.g., 106j storing data assets 126, 128, 130, 132, or a single data asset, e.g., 106b storing data asset 114. Operational nodes 104a, 104b, 104c, and 104d may execute a variety of application technologies in support of firm operations, e.g., node 104a executes various processes for generating intelligence reports, and e.g., node 104b executes various processes supporting user applications 152, and e.g., node 104c executes various processes for training an artificial intelligence 154, and e.g., node 104d executes various processes forming a data optimization tool 156. On will further appreciate that an operational node may also store data within a data collection, e.g., 102, and that the organization and applications and data stores shown in aspects 100 are for exemplary purposes only.

Figure 1D:
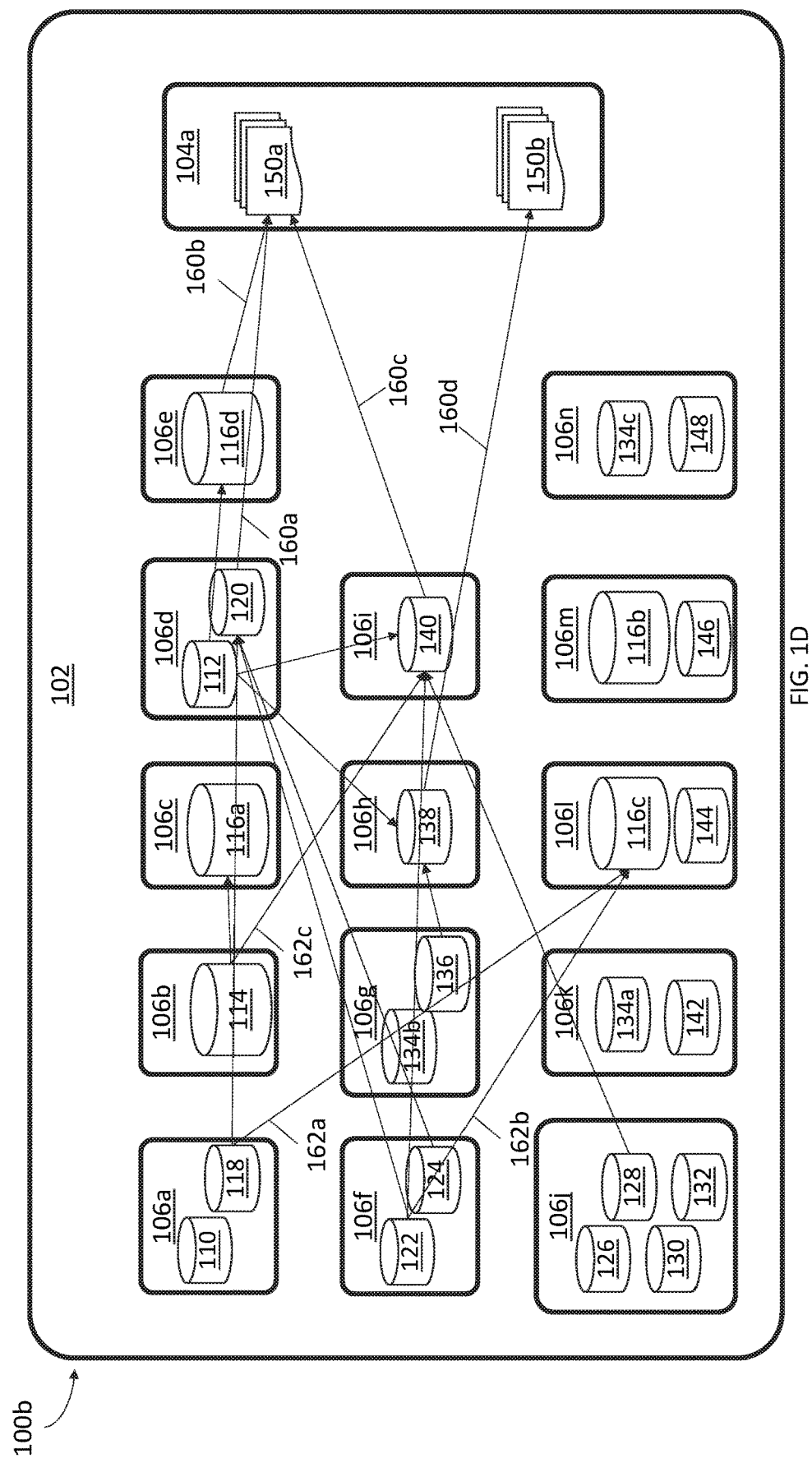
FIG. 1D illustrates aspects of a data collection in accordance with this disclosure.

FIG. 1D illustrates additional aspects of exemplary data processing resources 100b. Whereas FIG. 1C illustrates exemplary physical data interconnections between applications, e.g., 150, 152, 154, 156, executing on operational nodes 104a-104d, and data assets 110, 112, 114, 116, 118, 120, 122, 124, 126, 128, 130, 138, 136, 136, 138, 140, 142, 144, 146, 148 of a data collection 102 stored in storage data storage facilities 106a-106n, FIG. 1D illustrates exemplary data dependencies of exemplary data process 150 for a first three lineage levels, as will be further discussed below. For ease of illustrations, dependencies for lineage levels greater than 3 are not particularly illustrated in FIG. 1C. Exemplary data outflows 160a-160d are data dependencies of a first lineage level comprising intelligence reports 150a, 150b based on data assets of a second lineage level, which are in turn dependent on tables of a third lineage level, and so on until a set of datasets have no further dependencies. Thus, for a use case defined by data process 150, a lineage ordering requirement is established by data dependencies 160 of intelligence reports 150a and 150b. Upon reading this disclosure one will appreciate that data dependencies 160 are also outflows of lineage level 2 data sets.

Figure 1E:
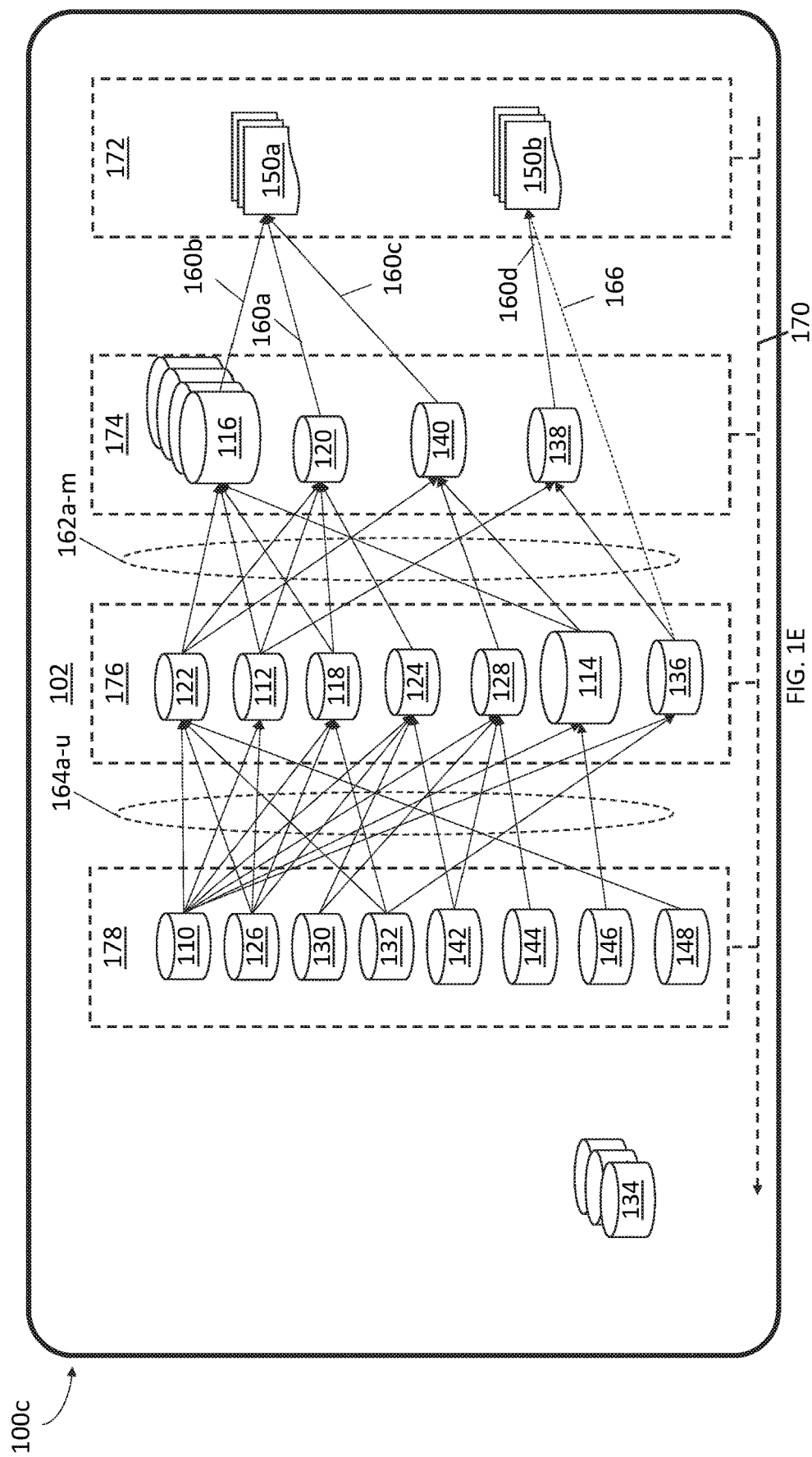
FIG. 1E illustrates aspects of a data collection in accordance with this disclosure.

FIG. 1E illustrates additional aspects of exemplary data processing resources 100c. Aspects 100c include an exemplary lineage ordering 170 of the exemplary data dependencies illustrated in FIG. 1D. For example, exemplary data process 150 may generate two exemplary intelligence reports 150a and 150b, which are use case data assets 172 and constitute lineage level 1. Each intelligence report is dependent on data assets 116, 120, 140, 138, which constitute lineage level 2, 174, which data assets are in turn dependent on data assets 122, 112, 118, 124, 128, 114, 136 constituting lineage level 3, 176. And data assets of lineage level 3 are in turn dependent on data assets 110, 126, 130, 132, 142, 144, 146, 148 constituting lineage level 4, 178. Data asset 134 is an unconnected data asset within lineage ordering 170 established by use case 172 associated with data process 150. As such data process 150 determines a lineage order requirement.

Upon reading this disclosure, one will appreciate that determining lineages by scanning data assets, e.g., of collection 102, for their dependencies, one is able to determine all the outflows of data for any particular use case relying on a data collection, e.g., data collection 102. A data catalog may be designed to include data asset dependencies such that once a use case, e.g., 172, or a first lineage level, is determined a lineage order, e.g., 170, and lineage levels greater than 1, e.g., 174, 176, 178, may be generated. Have determined a lineage ordering and associated lineage levels, a use case based data asset ranking may be generated as a function of each level's data outflows, e.g., outflows 160, 162, 164.

FIG. 1F illustrates aspects 100d of data catalog 180 in accordance with this disclosure. For example, data catalog 180 is a data catalog of data collection 102. Among other things it includes a collection of lineage level order requirement, e.g., 172, 181, 182, 183, 184, 185, 186, 187, 188, and associated data asset ranks, e.g., 190, 191, 192, 193, 194, 195, 196, 197, 198, for each lineage level order requirement. As one will appreciate upon reading this disclosure, a lineage level ordering requirement may include any combination of uses of a firms data by users as a use case. That is, a use case for creating a lineage order, e.g. 170, may include multiple uses case. And data asset ranks, e.g., 190, 191, 192, 193, 194, 195, 196, 197, 198, may include multiple ranks for multiple use cases, a single rank for a single use case, a single rank based on multiple use cases, or a combination thereof.

Figure 2:
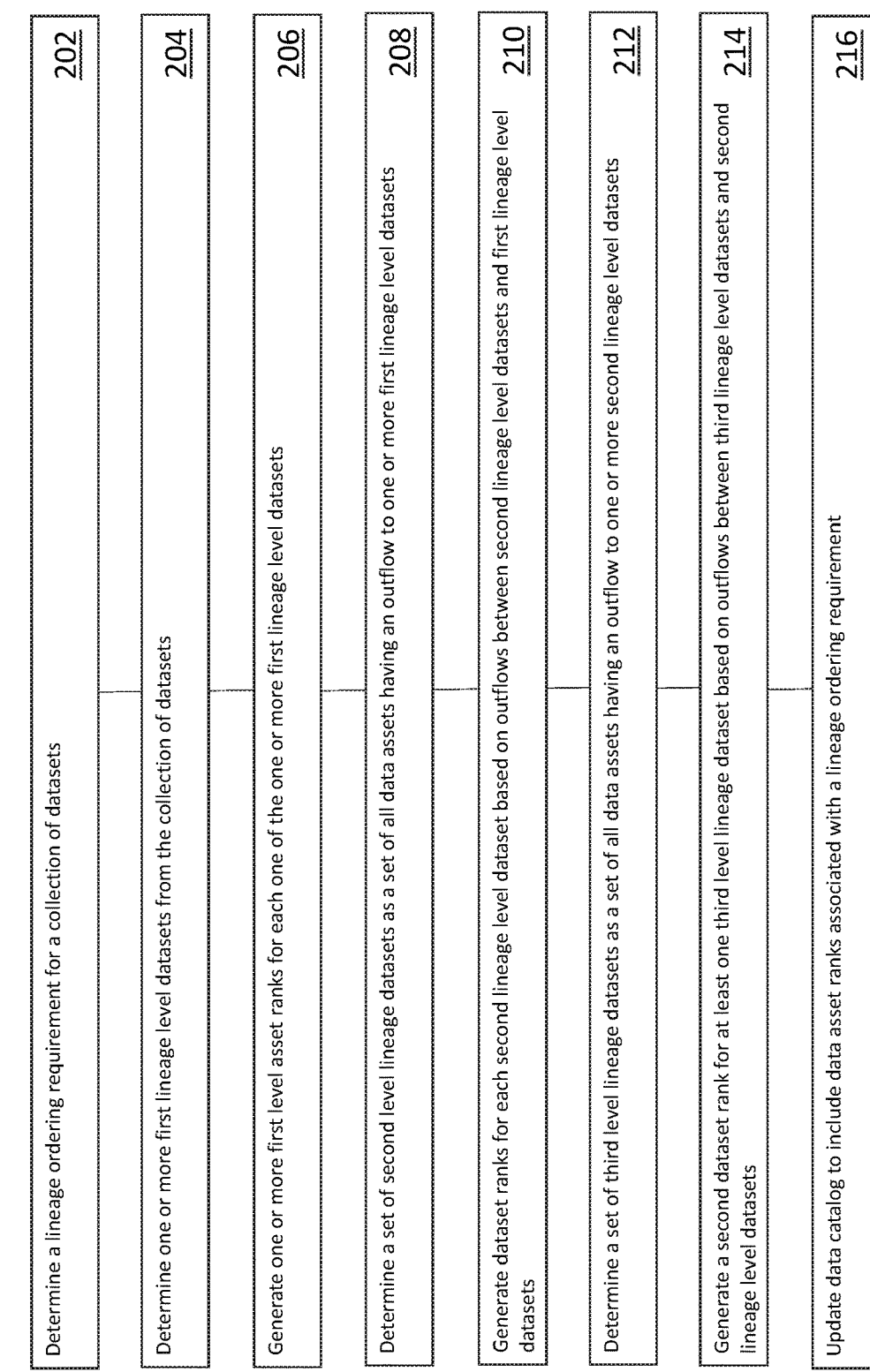
FIG. 2 illustrates a process of data asset ranking in accordance with this disclosure.

FIG. 2 illustrate a process 200 in accordance with this disclosure. In a step 202, determine a lineage level ordering requirement. As discussed above a lineage level ordering requirement is based on a particular use case. For example, In an embodiment, a network optimizer may be configured to optimize network resources at particular times throughout a day based on a schedule of processes. For example, an artificial intelligence training based on a day's accumulation of data may be scheduled to run at a first time, and a set of human consumable business intelligence reports may be scheduled to be generated at a second time, while a network and data optimization scan may be performed at a third time, while various daily user processes generally occur over a span of a fourth period of time corresponding to business hours. Thus, a network optimizer may optimize network resources to best facilitate various processes that occur throughout a day. A network optimizer in accordance with this disclosure may reference a data catalog, e.g., catalog 108, to retrieve or request a ranking of data assets associated with schedule processes in order to determine where within a data collection most relevant data is physically located, or over which data paths through a network, e.g., 108, such most relevant data travels in order to optimize data for those data paths. Similarly, where various datasets are updated by particular processes, a processor optimizer may allocate memory or processing resources to particular processes at particular times based on an understanding of which datasets and data processes are most important to scheduled processes. Alternatively, a security optimizer may desire to understanding data asset rankings, e.g., 194, of a use case, e.g., 184, comprising all possible use cases of a data collecting, e.g., 102. In this way, a security optimizer may better understand which data is most valuable and relevant in consideration of all of a firms data uses.

In a step 204, based on a selected lineage order requirement, first lineage level data assets are identified. As described above first lineage level data assets are assets directly used by a user, e.g., data inputs may be a first lineage level data asset to an artificial intelligence. Or, e.g., a collection of human consumable intelligence reports may be a first lineage level data asset. Alternatively, a first lineage level may be a set of datasets that are direct dependencies any user process. In some embodiment, as a general matter, a first lineage level may be any selected group of datasets as may be suitable to determine a lineage level ordering requirement for any desired use case.

In step 206, data asset ranks are determined for each first lineage level dataset. In step 208, a set of second lineage level datasets is determined as a set of all data assets having an outflow to one or more first lineage level datasets, and in step 210, data asset ranks are generated for second lineage level data assets based on outflows between second lineage level datasets and first lineage level datasets. In step 212, a set of third lineage level datasets are determined as a set of all data assets having an outflow to one or more second lineage level datasets, and in step 214, data asset ranks are generated for third lineage level data assets based on outflows between third lineage level datasets and first lineage level datasets. In step 216, a data catalog is updated or alternatively generated to include data asset ranks associated with a lineage ordering requirement. Such a data catalog may be drawn upon, accessed, or retrieved by various downstream systems to perform further operations based upon various asset rankings and lineages. Upon reading this disclosure, one will appreciate that while shown as separate steps, determining first, second, and third lineage levels, e.g., steps 204, 208, 212 may occur in a single step, or may all occur in separate steps before steps 206, 210, 214, and similarly, updating a data catalog, e.g., in step 216, may occur in real time as steps 206, 210, 214 occur rather than in a last step. One will further appreciate that many orderings of steps of process 200 are possible. One will further appreciate that steps of process 200 may be executed by a general processing machine by one or more processors coupled to memory and one or more data stores. Such data stores may include or read from non-transitory data stores that include instructions configured to cause such one or more processors to load such instructions into a non-transitory memory and execute such instructions causing such processors to carry out such exemplary steps of process 200. One will further appreciate that configuring such instructions in any suitable programming language is within the competency of one of skill in relevant arts.

Figure 3:
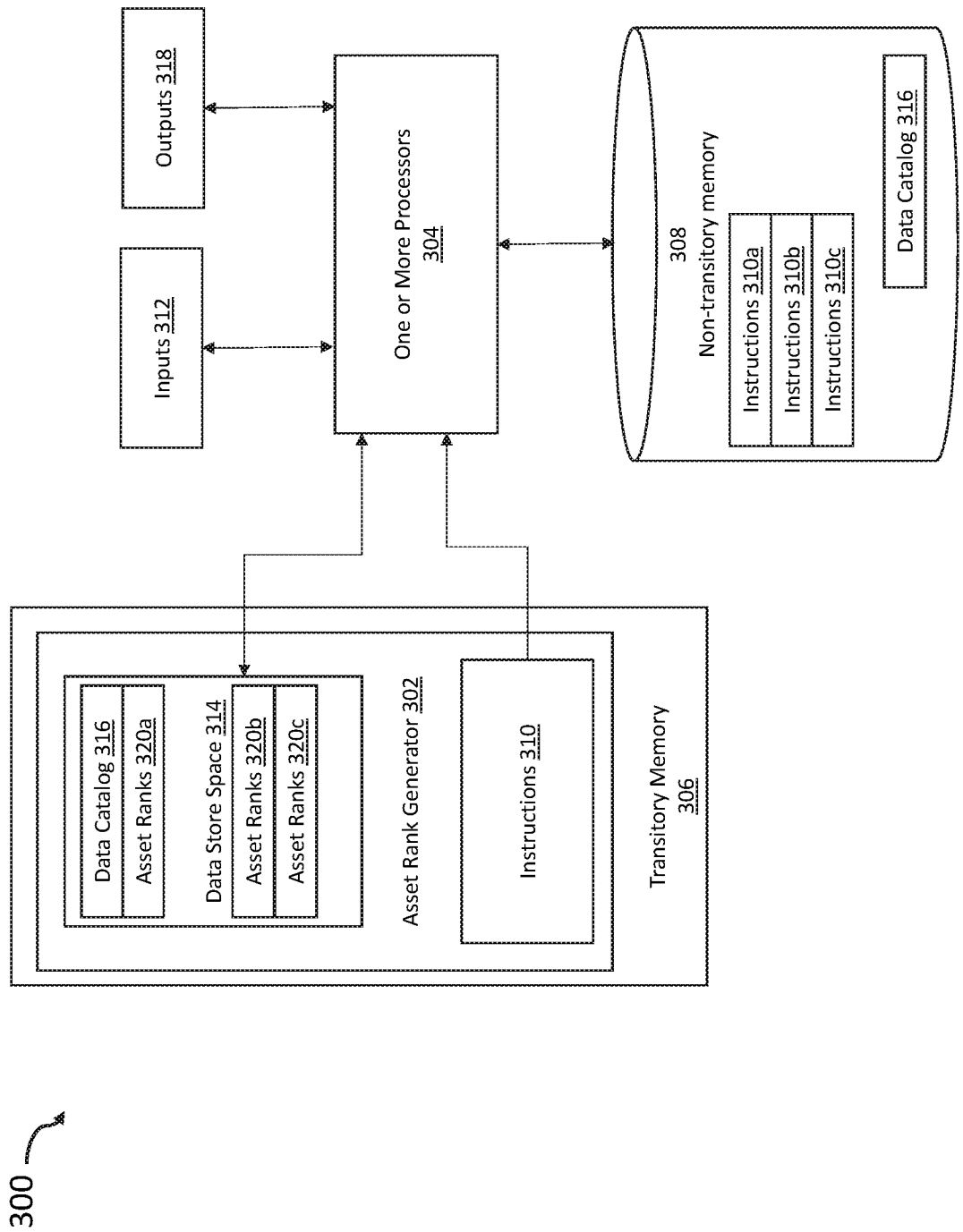
FIG. 3 illustrates an apparatus for data asset ranking in accordance with this disclosure

For example, as illustrated in FIG. 3, embodiments of systems 300 in accordance with this disclosure may include one or more processors 304 are operatively coupled to a non-transitory memory 308 and a transitory memory 306. Processors 304 is also configured to receive inputs 312 and outputs 318 as one of skill will appreciate. For example, inputs 312 may be a variety of inputs, such as user inputs, network inputs, sensor inputs, and outputs 318 may be outputs to user displays, network outputs, data outputs, control outputs and the like. Each input and outputs may be further coordinated by driver processes executing on one or more processors 304 (not illustrated). In an embodiment, one or more processors 304 load instructions 310 into non-transitory memory 306 in a location 302 reserved for an asset rank generator process, and execute instructions 310 causing one or more processors 304 to perform operations in accordance with this disclosure. In an embodiment, a data catalog 316 may also be loaded in non-transitory memory 306 or may remain stored on non-transitory memory 308 and, in either case, may be accessed or modified as needed or necessary. One or more processors 304 executing instructions 310 may cause one or more processors to generate one or more asset ranks, e.g., 320a, 320b, 320c and store asset ranks in a portion 314 of transitory memory allocated for data storage for asset rank generator 302. From memory 306, such data asset ranks 320a, 320b, 320c may be added to data catalog 316 or output through one or more outputs 318 to downstream processes. One will appreciate that processors may access or retrieve what data it needs using inputs 312 or outputs 318, e.g., for requesting and receiving networked data.

In an embodiment, exemplary data asset ranking instructions 310a are based on dataset outflows in accordance with this disclosure and may be implemented by performing operations to generate data asset ranks of particular datasets based on relationships in accordance with relationships expressed, for preciseness, as described above in reference to FIGS. 1A and 1B:

$$AR(j, v) = \begin{cases} \frac{1}{d}\left(\frac{1}{1+N(1)}\right), & v = 1; \\ \frac{1}{d} \cdot \sum_{k=1}^{N(v-1)} \frac{W(k_{v-1}, j_v) \cdot AR(k_{v-1}, v-1)}{1 + \sum_{i=1}^{N(v)} W(k_{v-1}, i_v)}, & v \neq 1; \end{cases}$$

Where, in relationships in accordance with the above expression:

$AR(j, v)$ = Asset Rank of Data set $j$ in lineage level $v$, $j$ = index of dataset in lineage level $v$ $N(v)$ = Total number of datasets in lineage level $v$ $W(m, n) = \begin{cases} w, \text{ where } w \text{ is a number of outflow from} \\ \quad \text{dataset } n \text{ in lineage level } v \text{ to dataset} \\ \quad m \text{ in lineage level } v - 1; \\ 0, \text{ no outflow from } n \text{ in lineage level } v \\ \quad \text{to } m \text{ in lineage level } v - 1; \end{cases}$ $d$ = a damping factor Thus, data asset ranks in accordance with instruction 310a are a function of, or are based on, outflows from each dataset, data asset ranks for each data asset in a higher lineage level, and a damping factor, which may be selected such that all results once summed are approximately 1. In a preferred embodiment, d=2.

Figure 4:
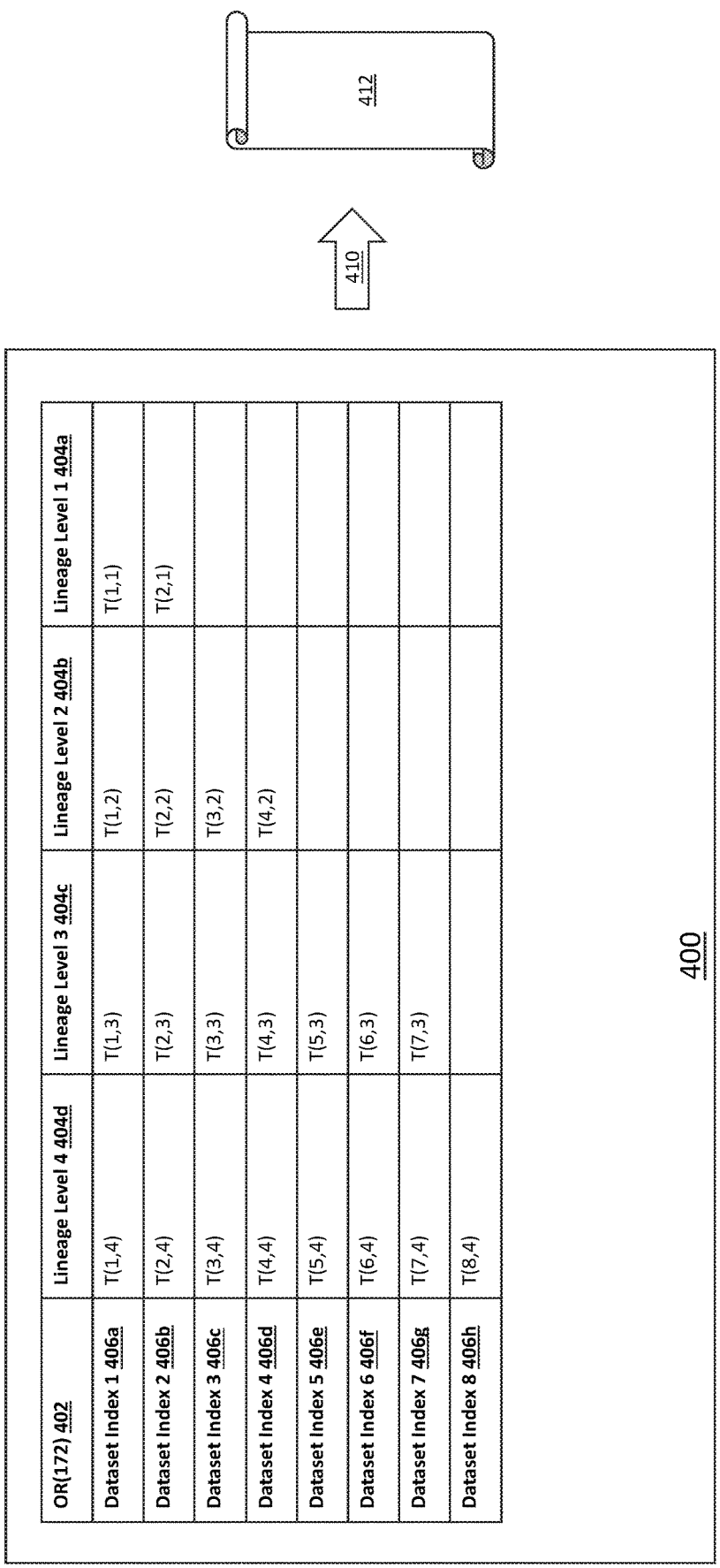
FIG. 4 illustrates a data structure for storing a data asset ranking in accordance with this disclosure.

For example, data asset rankings in accordance with instructions 310a, operating in data collection 102 may generate dataset ranks 320a based on exemplary lineage order 170 and based on lineage ordering requirement of exemplary process 150, i.e., a lineage ordering requirement may be a data use case. Such dataset ranks 320a may be stored in an exemplary data structure 400 illustrated in FIG. 4. Exemplary data structure 400 includes an ordering requirement 400, in this exemplary case, order requirement 402 is based on lineage ordering requirement imposed by process 150 (i.e., intelligence reports 150a and 150b), i.e., first lineage level 172. This exemplary lineage includes four lineage levels 404a-404d, and each lineage level includes a group of datasets having indexes 406a-406h. Thus, data structure 400 is configured to store a data asset rank, T(j,v), for each data asset j in a lineage level v, for v∈{1, 2, 3, 4} (in this example having a total of 4 lineage levels).

In reference to FIG. 1E, exemplary data structure 400, generated for ordering requirement 402, stores data asset rank T(1,1) for intelligence report 150a and T(2,1) for intelligence report 150b. Data structure 400 also stores data asset rank T(1,2) for dataset 116, data asset rank T(2,2) for dataset 120, data asset rank T(3,2) for dataset 140, and data asset rank T(4,2) for dataset 138. Data structure 400 also stores data asset ranks T(j, 3) for data assets in lineage level 3, 176, and data asset ranks T(j,4) for data assets in lineage level 4, 178. In general, once a data structure 400 is generated it may be stored in a suitable location in any desired form. In an embodiment, data catalog 412 is updated 410 to include data structure 400. In reference to exemplary system 300, an asset rank data structure 400 may be stored in a memory location allocated for asset ranks 320a, and data catalog 316 may be updated to include a data structure 400, i.e., by one or more processors 304 executing instructions 310. One will appreciate that configuring such instructions 310, including 310a, in any suitable programming language is within the competency of one of skill in relevant arts.

For embodiments employing exemplary instructions 310a to analyze exemplary data collection 102, for lineage order 170, will obtain exemplary results shown below in Table 2.

TABLE 2

| Data Asset Rank | Asset Rank Value |
|---|---|
| T(1, 1) | 0.16666 |
| T(2, 1) | 0.16666 |
| T(1, 2) | 0.020834 |
| T(2, 2) | 0.020834 |
| T(3, 2) | 0.020834 |
| T(4, 2) | 0.041668 |
| T(1, 3) | 0.006771 |
| T(2, 3) | 0.011111 |
| T(3, 3) | 0.004167 |
| T(4, 3) | 0.002083 |
| T(5, 3) | 0.002604 |
| T(6, 3) | 0.004688 |
| T(7, 3) | 0.006944 |
| T(1, 4) | 0.005457 |
| T(2, 4) | 0.003258 |
| T(3, 4) | 0.000469 |
| T(4, 4) | 0.002355 |
| T(5, 4) | 0.000469 |
| T(6, 4) | 0.00026 |
| T(7, 4) | 0.000781 |
| T(8, 4) | 0.000677 |

The asset rank values in Table 2 assume that each outflow from each data asset has an equal weight. This would be the case where, e.g., each data outflow, e.g., 160, 162, 164, includes only one columnar outflow between any dataset in a row v and another dataset in for v-1. In an embodiment where multiple columnar outflows are present between datasets, such an outflow can be weighted as multiple outflows. For example, if outflow 160a represents a dependence by 150a three columns of data in dataset 120, then outflow 160a would be treated as three outflows. In an embodiment, additional weights may be applied where a dataset is known to be an important data asset. Or, where a particular user consumable is known to be of greater importance, e.g., it is known that intelligence report 150b is of greater operational importance than intelligence report 150a, additional weight may be applied to datasets having an outflow leading into.

Also, in the examples discussed in reference to data collection 102, each dataset is only present in one lineage level, but a dataset may be present in multiple lineage levels.

For example, consider a situation in which lineage ordering 170 includes an additional outflow 166 between dataset 136 and intelligence report 150b, such that dataset 136 is actually in both lineage level 2, 174, and lineage level 3, 176. In such cases, a preferred embodiment treats a dataset in two or more lineage levels, e.g., dataset 136 when outflow 166 is present, as if it is in a lowest lineage level for purposes of asset rank calculation. In other embodiments, such a dataset may be treated as if it is in a higher lineage level, and in other embodiments, such a dataset may be treated as two datasets, one in each level, and a total asset rank may be a sum asset ranks associated with such as dataset in each relevant lineage level.

Another exemplary method of generating data asset ranks approaches ranking by imputing data importance by each outflow from a higher lineage level to a lower lineage level. Under this model, each outflow introduces a certain amount of information into each target node, i.e., dependent node. In reference to FIG. 3, instructions 310 include an alternative process 310b for generating dataset ranks based on a model imputing additional information in each outflow. In an embodiment, exemplary data asset ranking instructions 310b are based on dataset outflows in accordance with this disclosure and may be implemented by performing operations to generate data asset ranks of particular datasets based on relationships in accordance with relationships expressed, for preciseness, as follows:

$$AR(j, v) = \begin{cases} 1 + \sum_{k=1}^{N(v-1)} W(k_{v+1}, j_v) \cdot AR(k_{v+1}, v+1) \\ 1, v = T \end{cases}$$

For all for all v, where $v+1 \leq T$, where T is the total number of lineage levels in a lineage ordering. And where $W(k_{v+1}, j_v)$ is the number of component outflows from dataset k at lineage level $v+1$ and dataset j at lineage level v. For exemplary instruction 310, an additional step of determining a highest lineage level is required to locate an entry point into such a ranking process. Once a highest lineage level is determined, e.g., lineage level v=T the total number of lineage levels, each dataset in lineage level T is assigned a rank of 1, and then asset ranks for each lineage level are generated in a feed forward process, as datasets of a lineage level are dependent on dataset outflows of a higher level. Thus, alternative instructions 310b may generate data asset ranks 320b and store them, e.g., in memory space 302. As with data asset ranks 320a, data asset ranks 320b may also be included in data catalog 316, or otherwise provided to downstream processes. One will appreciate that configuring such instructions 310, including 310b, in any suitable programming language is within the competency of one of skill in relevant arts.

For illustrative purposes, alternative instructions 310b may generate data asset ranks 320b of datasets in data collection 102, for lineage ordering 170 as shown in Table 3, below:

TABLE 3

| Data Asset Rank | Asset Rank Value |
|---|---|
| T(1, 1) | 49 |
| T(2, 1) | 8 |
| T(1, 2) | 16 |
| T(2, 2) | 18 |

TABLE 3-continued

| Data Asset Rank | Asset Rank Value |
|---|---|
| T(3, 2) | 14 |
| T(4, 2) | 7 |
| T(1, 3) | 5 |
| T(2, 3) | 3 |
| T(3, 3) | 4 |
| T(4, 3) | 5 |
| T(5, 3) | 5 |
| T(6, 3) | 3 |
| T(7, 3) | 3 |
| T(1, 4) | 1 |
| T(2, 4) | 1 |
| T(3, 4) | 1 |
| T(4, 4) | 1 |
| T(5, 4) | 1 |
| T(6, 4) | 1 |
| T(7, 4) | 1 |
| T(8, 4) | 1 |

Thus, data asset ranks according to alternative instructions 310b identify datasets as having a higher rank based on a model that places increased weight on information aggregated between each lineage level.

Another exemplary method of generating data asset ranks approaches ranking by a probabilistic method that assigns value by a probability that individual data units within a dataset are associated with a particular upstream lineage level data set. Under this model, each outflow is weighed as a probability that outflow data from any particular dataset forms a portion of data consumed by a user. In reference to FIG. 3, instructions 310 include an alternative process 310c for generating dataset ranks based on a probabilistic model. In an embodiment, exemplary data asset ranking instructions 310c are based on dataset outflows in accordance with this disclosure and may be implemented by performing operations to generate data asset ranks of particular datasets based on relationships in accordance with relationships expressed, for preciseness, as follows:

$$AR(j, v) = \begin{cases} \dfrac{1}{2 * N(v)} \cdot \sum_{k=1}^{N(v-1)} \dfrac{W(k_{v+1}, j_v) \cdot AR(k_{v+1}, v+1)}{\sum_{j=1}^{N(v)} W(k_{v-1}, j_v)}, v > 1 \\ \dfrac{1}{2 * N(1)}, v = 1 \end{cases}$$

Where, in relationships in accordance with the above expression:

$AR(j, v)$ = Asset Rank of Data set $j$ in lineage level $v$, $j$ = index of dataset in lineage level $v$ $N(v)$ = Total number of datasets in lineage level $v$ $W(m, n) = \begin{cases} w, \text{ where } w \text{ is a number of outflow from dataset } n \text{ in lineage level } v \text{ to dataset } m \text{ in lineage level } v - 1; \\ 0, \text{ no outflow from } n \text{ in lineage level } v \text{ to } m \text{ in lineage level } v - 1; \end{cases}$ Thus, alternative instructions 310b may generate data asset ranks 320c and store them, e.g., in memory space 302. As with data asset ranks 320a, data asset ranks 320c may also be included in data catalog 316, or otherwise provided to downstream processes. One will appreciate that configuring such instructions 310, including 310a, in any suitable programming language is within the competency of one of skill in relevant arts.

It will be appreciated that exemplary data asset ranking alternative processes 310a, 310b, and 310c are merely exemplary cases of asset ranking based on use case based lineage ordering, e.g., 170, and data outflows, e.g., 160, 162, 164, in accordance with this disclosure. Specific implementations and variations may be left to a specific design.

Figure 5:
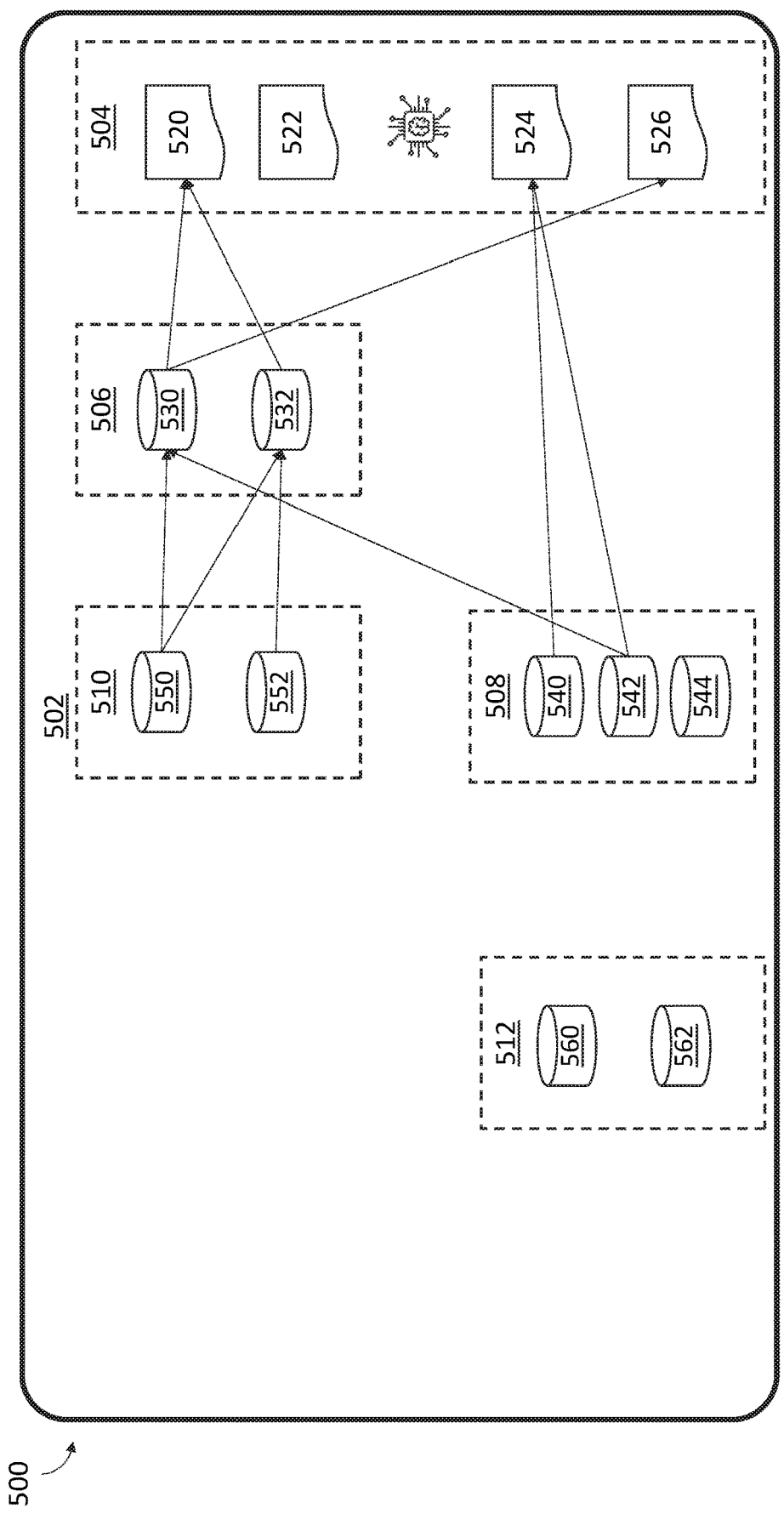
FIG. 5 illustrates aspects of data asset ranking in accordance with this disclosure.

FIG. 5 also illustrates various aspects 500 of embodiments in accordance with this disclosure. In an exemplary embodiment, an artificial intelligence training system 504 includes four datasets 520, 522, 524, and 526 as input to an artificial intelligence. One input dataset 522 is a relatively static dataset having no external data dependencies. System 504 is, however, dependent on a number of additional systems 506, 508, and 510 within a data collection 502. An additional system 512 operates within data collection 502, but provides no outflow to process 504. Furthermore, while system 508 does include outflows to system 504, i.e., from datasets 540, 542 to dataset 524, a dataset 544 within system 508 has no outflow to system 504. In an embodiment, it is desirable to assign each dataset a value regardless of whether it has no outflow for a particular lineage ordering requirement, e.g., dataset 134 in data collection 102 for lineage ordering 170. Thus, each type of unconnected asset is treated in preferred embodiments according to a specific rule. For an unconnected asset of a first type, such as 544, e.g., a data asset within a system having outflows, a lineage level of the lowest lineage for datasets within such a system is assigned. For example, in a preferred embodiment dataset 544 is assigned a lineage level of a lowest lineage level of all datasets within system 508, in exemplary case 500, dataset 544 is assign lineage level 3 corresponding to a lineage level assigned to dataset 542, and ghost outflows are assumed between dataset 544 and all datasets in lineage level v-1, e.g., lineage level 2 in the case of dataset 544 assigned to lineage level 3. But in order to account for dataset 544 being unconnected, an additional unconnected damping factor is applied a dataset rank for 544. In a preferred embodiment, a first type unconnected asset, e.g., 544, is assigned a penalty damping factor of 0.25 when generating an associated data asset rank. Such a penalty damping factor is exemplary, and any suitable damping factor may be employed based on a specific application. For example, a penalty damping factor may be increase when an analysis is certain that unconnected datasets are irrelevant to downstream applications relying on a data asset rank, while a penalty damping factor may be decreased when there is uncertainty about the importance of an unconnected data asset to downstream processes.

A second type of unconnected asset, e.g., is both unconnected within a particular lineage ordering and is also not part of a system that has an outflow within a particular lineage ordering. For example, datasets 560 and 562 within system 512 are both unconnected and within a system having no outflows for a lineage ordering for system 504. Note, while it is possible that both datasets 560 and 562 may have inflow from upstream datasets, system 512 has no outflow and thus is entirely unconnected. In preferred embodiments, such a type two unconnected dataset is assigned to lineage level 2 and ghost outflows are assumed to all lineage level 1 datasets, and a type two penalty. In a preferred embodiment a type two penalty is a multiple of a type one penalty discussed above, e.g., a type two penalty is eight times more significant than a type one penalty, e.g., for a type one penalty=0.25, a type two penalty is equal to 0.03125.

Figure 6:
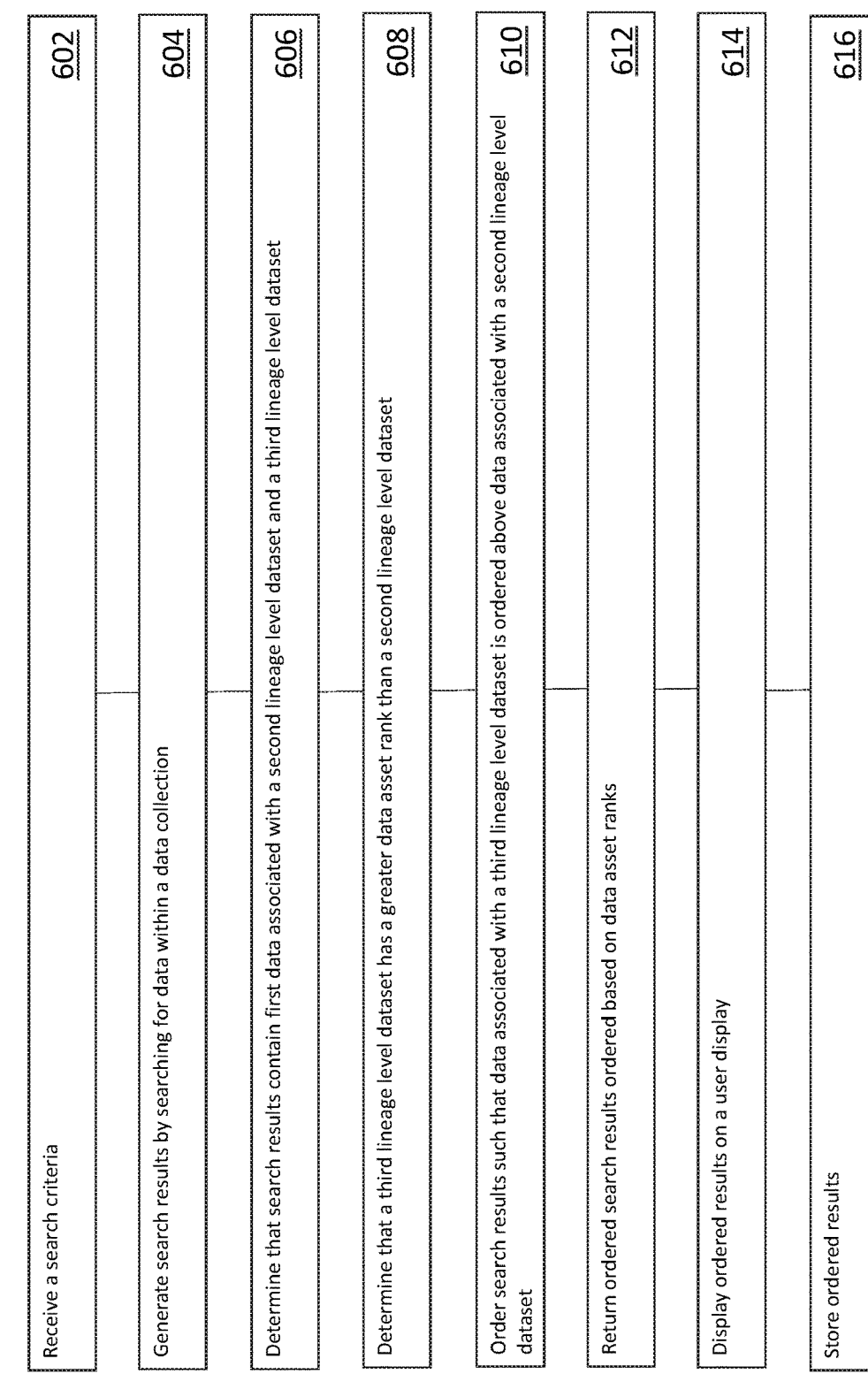
FIG. 6 illustrates a process employing data asset ranking in accordance with this disclosure.

FIG. 6 illustrates an exemplary process 600 in accordance with this disclosure. In stop 602 a search criteria is received, which may be either a data search or a dataset search. In step 604 a set of search results are generated by searching data within a data collection. Such a search may be of operational data or of metadata objects or both. In step 606, it is determined that search results include data associated with a second lineage level dataset and data associated with a third lineage level dataset. For example, at step 606 a data catalog, e.g., 412, may be referenced to determine data rankings, or data rankings may be generated responsive to search criteria. When a data catalog does not include relevant data asset rankings, in some embodiments a search function is configured to also receive a search criteria use case to inform the search function of the context in which the requested data is used; in such a case a data asset ranking may be generated, at step 606, in accordance with this disclosure, employing a lineage ordering determined by the search criteria use case.

In step 608, it is determined that a third lineage level dataset has a greater asset rank than a second lineage level dataset, and in 610 search results are ordered such that data associated with a third lineage level dataset is ordered above data associated with a second lineage level dataset, and at step 612 ordered search results are returned to the search requester. In a step 614, the search results may be displayed, e.g., on a user display device, and/or in step 616 the results may be stored. In an embodiment, ordered results are further provided to a downstream processing system.

Figure 7:
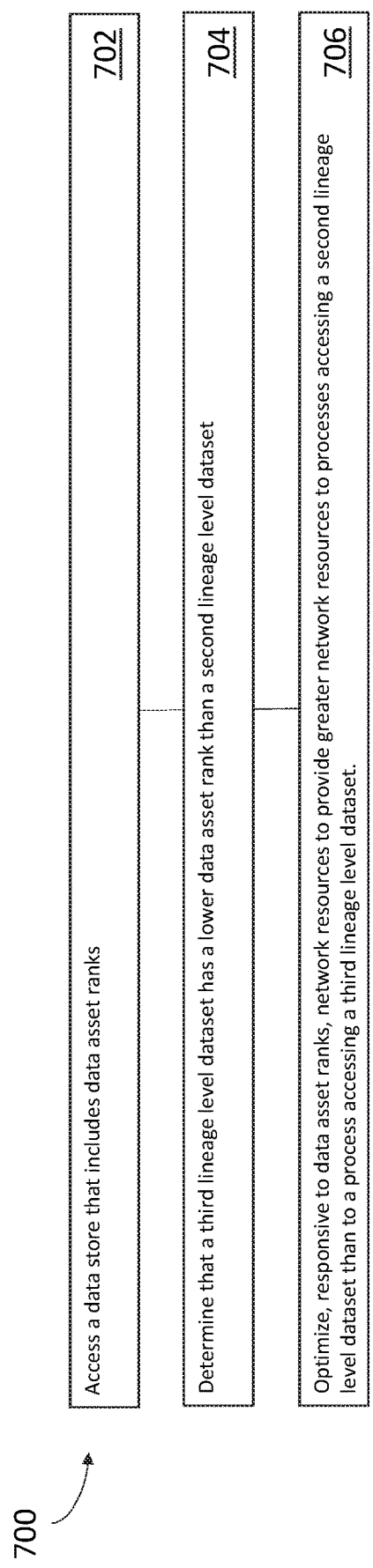
FIG. 7 illustrates a process employing data asset ranking in accordance with this disclosure.

FIG. 7 illustrates an exemplary process 700 in accordance with this disclosure. At step 702 data asset ranks generated in accordance with this disclosure are accessed. At step 704 it is determined that third lineage level dataset has a lower asset rank than a second lineage level dataset. And at step 706 network resources are optimized to provide greater network resources to processes accessing a second lineage level dataset than are provided to processes accessing a third lineage level dataset.

Figure 8:
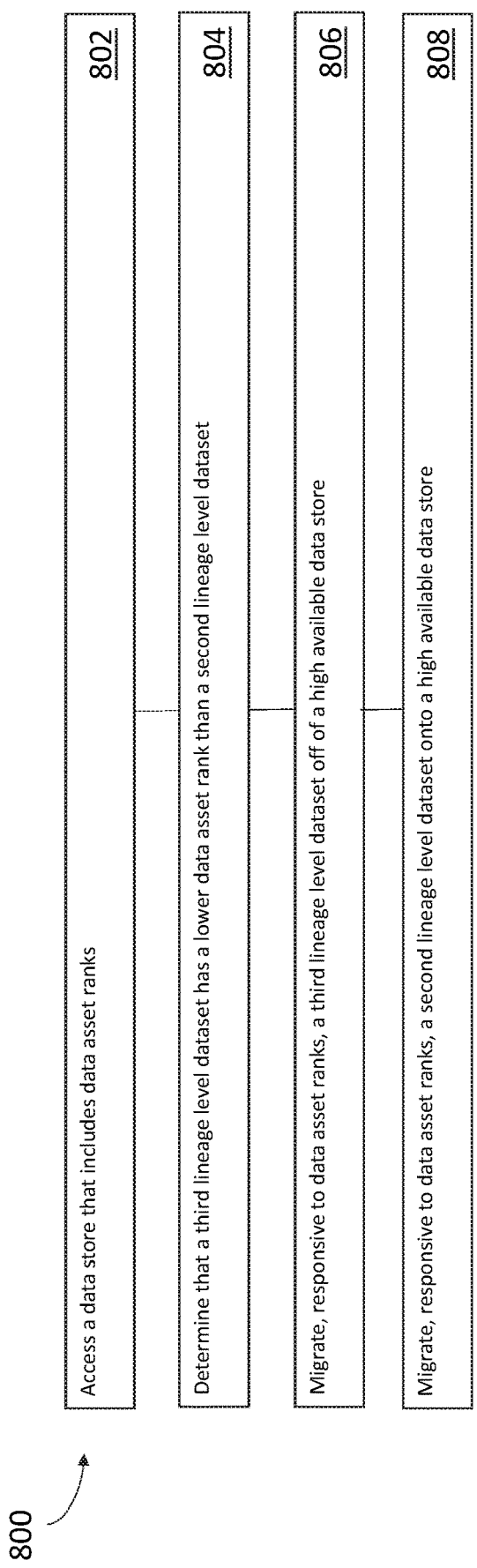
FIG. 8 illustrates a process employing data asset ranking in accordance with this disclosure.

FIG. 8 illustrates an exemplary process 800 in accordance with this disclosure. At step 802 data asset ranks generated in accordance with this disclosure are accessed. In step 804 it is determined that a third lineage level dataset has a lower data asset rank than a second lineage level dataset. In step 806, the third lineage level dataset having a lower data asset rank is migrated off of a high availability data storage facility, and in step 808 the second lineage level dataset is migrated onto a high available data storage facility.

Figure 9:
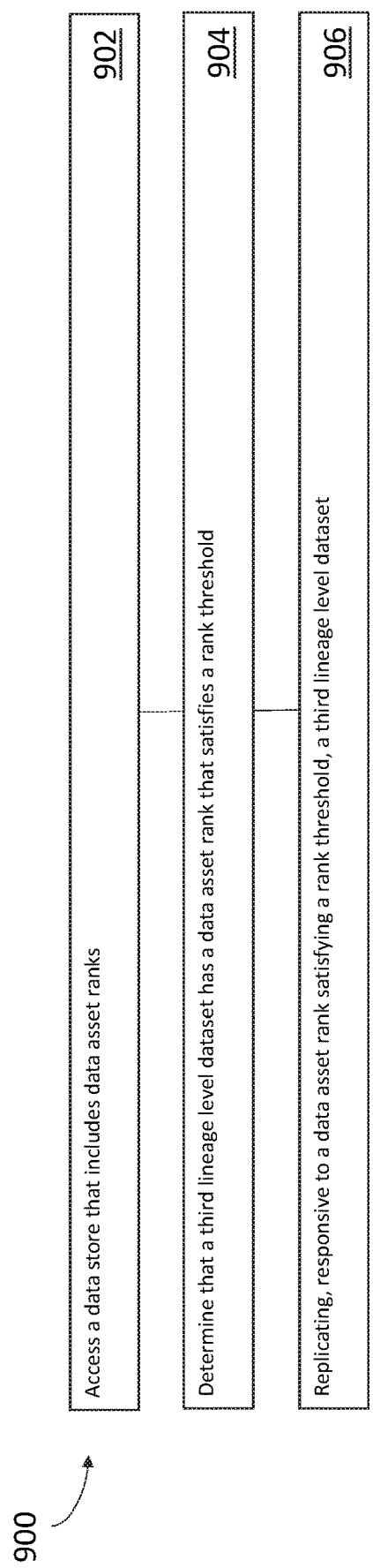
FIG. 9 illustrates a process employing data asset ranking in accordance with this disclosure.

FIG. 9 illustrates an exemplary process 900 in accordance with this disclosure. At step 902 data asset ranks generated in accordance with this disclosure are accessed. In step 904 it is determined that a third lineage level dataset satisfies a data asset rank threshold. And in step 906, the third lineage level dataset satisfying a data asset rank threshold is replicated. For example, it may be replicated to a physical remote data storage facility to create a backup copy at a backup location to prevent data loss in the event of a catastrophic event at the third lineage level dataset's primary location.

Figure 10:
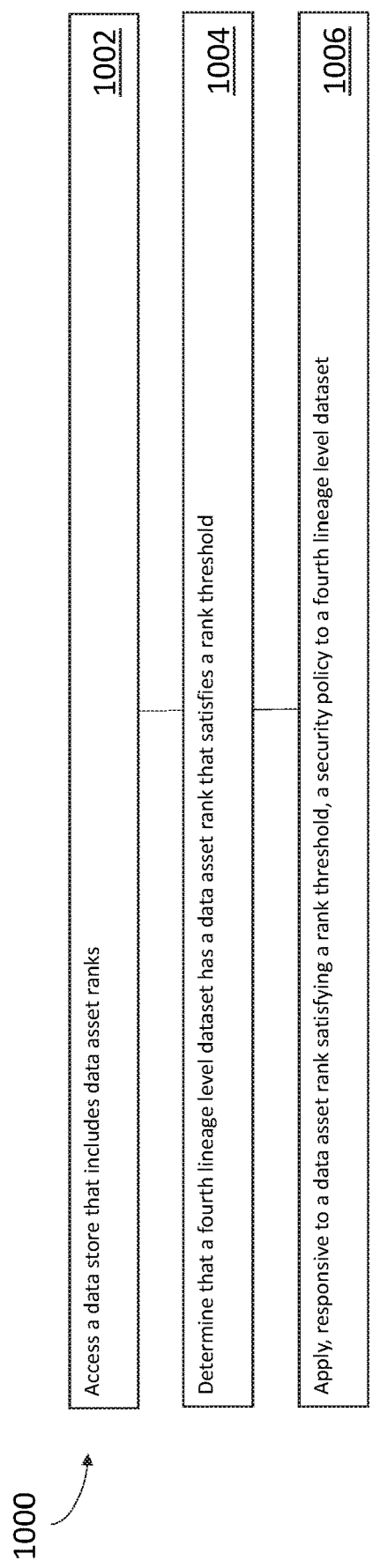
FIG. 10 illustrates a process employing data asset ranking in accordance with this disclosure.

FIG. 10 illustrates an exemplary process 1000 in accordance with this disclosure. At step 1002 data asset ranks generated in accordance with this disclosure are accessed. In step 1004 it is determined that a fourth lineage level dataset satisfies a data asset rank threshold. And at step 1006 a security policy is applied to the fourth lineage level dataset.

For example, the security policy may be defined for protecting data assets having a data asset rank satisfying a threshold.

In exemplary embodiments, a data catalog configured in accordance with this disclosure is implemented by a computer processing system executing specific instructions which are configured to cause a computer processing system to catalog an entire data collection spanning many data storage facilities in order to determine an asset rank as a measure of how relevant a particular dataset is to a collection of datasets that form an interface between a machine learning process and a firm's data collection. In another example, a data catalog is implemented by a computer processing system executing specific instructions which are configured to cause a computer processing system to catalog an entire data collection spanning many data storage facilities in order to determine an asset rank for each dataset within the data collection as a measure of how relevant a particular dataset is to a collection of datasets that are consumed by an artificial intelligence process. In another example, a data catalog is implemented by a computer processing system executing specific instructions which are configured to cause a computer processing system to catalog an entire data collection spanning many data storage facilities in order to determine an asset rank as a measure of how relevant a particular dataset, e.g., a table, a collection of tables, or another unit of data, is to a collection of datasets that are consumed by a machine learning process. In each case, it is desirable that automated data cataloguing be entirely objective and mechanical so that it may be executed and performed by a generic computer processor without human intervention. Thus, a data catalog configured in accordance with this disclosure catalogs is able to generate an asset rank for each data asset in a manner that is relevant for a particular use case, and such a rank is able to be generated for each data asset without a ranking process becoming distorted by hanging data assets and by unconnected data assets.

In a non-limiting exemplary embodiment, a use case may be an image recognition training system for training an artificial intelligence, in which case most-relevant information may be found in image datasets that include images and in datasets that include data tags associated with images within the image datasets, or in tables comprising inputs, weights, activation tables, and constants associated with perceptrons of an artificial intelligence's neural network. In another example, a use case may be assembly line optimization data organized into a human consumable data structure, such as a data structure configured to populate an intelligence report based on an analysis of time series data or associated extrapolated data arising from sensors and controls distributed throughout an assembly line. Upon reading this disclosure, one will appreciate that data assets within a data collection may have far different relevance and importance when analyzed for a specific use case, i.e., specific consumers of data from a data collection, whether a human consumer or a machine based consumer. Thus, data asset rank generation in accordance with this disclosure provides an objective and mechanical enhancement to multiple technologies. One will appreciate upon reading and understanding this disclosure that the exemplary technologies disclosed herein are non-limiting.

In an embodiment, an input to an artificial intelligence may be defined be one or more data structures within one or more datasets. An artificial intelligence input data structure may comprise a computer readable organization of data inflowing from a first group of datasets, which may be data tables from a plurality of databases. The first group of datasets may each respectively comprise a computer readable organization of data inflowing from a second group of datasets. In each case, one or more datasets may comprise static data or dynamic data, such as data sampled from one or more industry processes by one or more sensors, or such dynamic data may be a heavily used firm data resource, such as a knowledge base. This flow of data from one dataset to another until a set constituting a use case is referred to as a lineage, and the number dataset outflows that are traversed between a data asset and a use case data set is a lineage level. In an embodiment, a use case data set is lineage level 1. In other embodiments a use case data set is lineage level 0.

In an embodiment, a first lineage level may be a use case, e.g., a set of human consumable data structures populating an intelligence report or a set of input tables forming an input to an information system, such as an artificial intelligence training process, or to a trained artificial intelligence, or to a network optimization system, or to a data security optimization system, or to a data availability optimization system. A second lineage level would include all of the data assets that include data populating, or outflowing to, first lineage level data assets. And likewise a third linage level would include all of the data assets having an outflow to second lineage level data assets, and so on.

All of the data within a data collection may have an asset rank associated with a particular use case, such that a first data asset may have a first asset rank as a function of being a second lineage level data asset for a first use case and also have a second asset rank as a function of being a fifth lineage level data asset in a second use case. Thus, a particular use case defines a lineage order requirement, because each asset may be in a different lineage level for a particular use case.

In an embodiment, an enterprise data catalog in accordance with this disclosure indexes key data assets in an organization. Users may discover relevant tables, views, files and reports for their analytic needs within a such a data catalog by obtaining results weighted by asset rank. Asset rank can be used for ranking data assets for search queries in the catalog. In an embodiment, a subgraph presented as a result set of a query may be used to sort the results with assets of higher asset rank showing first based on asset rank.

In an embodiment, asset rank can be used to identify the most important assets for identification to data security systems in order be protected better against data security hacks. Additionally, it is important to ensure that the data assets with high asset rank do not pose any data privacy risks, as by definition these assets reach the most humans consuming data in the organization. Thus, a data asset rank system may flag high value data assets to a data privacy process or system.

In an embodiment, data asset rank may be used to improve accessibility of data assets with high asset rank. A high availability system may shift high value data assets to high availability data stores from lower availability data stores. For example, a high value data asset may be moved to a cloud object store instead of a local file system data store thereby ensuring such data assets are resilient against any disruptions.

In data catalogs, subject matter experts mark data assets as certified thereby ensuring their discoverability. Data asset ranking can in an automated mechanism to identify high value data assets in order to automatically certify data assets having a data asset rank higher than a threshold.

A data asset ranking system may be used to automatically rank assets for automatic data integration improvements, for example a high value data asset may trigger a data integration recommendation. For example, a recommendation may include joining a high ranking data asset as part of data integration task.

We claim:

1. A method executed by one or more computing devices for determining dataset rankings, the method comprising:
   determining a lineage ordering requirement for a collection of datasets;
   determining, from the lineage order requirement, one or more first lineage level datasets from the collection of datasets;
   generating one or more first lineage level asset ranks respectively for each one of the one or more first lineage level datasets;
   determining at least one second lineage level dataset having an outflow to the one or more first lineage level datasets;
   generating a first dataset rank for the at least one second lineage level dataset as a first function of the outflow and at least one of the one or more first lineage level asset ranks.

2. The method of claim 1, wherein the lineage order requirement is a data user and the one or more first lineage level datasets are data tables accessed directly by the data user.

3. The method of claim 2, wherein the lineage order requirement is an information processing system and the one or more first lineage level datasets are one or more human consumable reports generated by the information processing system.

4. The method of claim 1 further comprising generating a second dataset rank for at least one third lineage level dataset as a second function of at least a second outflow from the at least one third lineage level dataset to the at least one second lineage level dataset, the second function further dependent on the first dataset rank and a dampening factor.

5. The method of claim 1, further comprising:
   receiving a search criteria;
   generating results by searching for data within the collection of datasets;
   determining that the results contain first data from the at least one second lineage level datasets and second data from at least one third lineage level dataset;
   determining that the at least one third lineage level dataset has a second dataset rank that is greater than the first dataset rank;
   and providing the results such that the second data from the at least one third lineage level dataset is before the first data from the at least one second lineage level dataset.

6. The method of claim 5, wherein the data search criteria includes a data use case associated with the lineage ordering requirement.

7. The method of claim 1, wherein the collection of datasets includes a plurality of datasets residing in a plurality of physically separate data stores, the physically separate data stores interconnected by a network, the method further comprising:
   determining that the at least one third lineage level dataset has a second dataset rank that is less than the first dataset rank; and
   optimizing network resources to provide greater access to the second lineage level dataset than to the third lineage level dataset.

8. The method of claim 1, wherein the collection of datasets include a third level lineage dataset on a high availability server, the method further comprising:
   determining that the at least one third lineage level dataset has a second dataset rank that is less than the first dataset rank;
   transferring the third lineage level dataset off of the high availability server; and
   transferring the second lineage level dataset to the high availability server.

9. The method of claim 1, further comprising:
   determining that the first dataset rank exceeds a threshold; and
   replicating, responsive to determining the first dataset rank exceeds a threshold, the at least second lineage level dataset.

10. The method of claim 1, further comprising:
    determining that the first dataset rank exceeds a threshold; and
    apply, responsive to determining the first dataset rank exceeds a threshold, a security policy to the at least one second lineage level dataset.

11. An apparatus for determining dataset rankings, the apparatus comprising:
    one or more processors; and
    one or more memories operatively coupled to at least one of the one or more processors and having instructions stored thereon that, when executed by at least one of the one or more processors, cause at least one of the one or more processors to:
      determine a lineage ordering requirement for a collection of datasets;
      determine, from the lineage order requirement, one or more first lineage level datasets from the collection of datasets;
      generate one or more first linage level asset ranks respectively for each one of the one or more first lineage level datasets;
      determine at least one second lineage level dataset having an outflow to the one or more first lineage level datasets;
      generate a first dataset rank for the at least one second lineage level dataset as a first function of the outflow and at least one of the one or more first lineage level asset ranks.

12. The apparatus of claim 11, wherein the instructions are further configured to cause at the least one of the one or more processors to:
    receive a search criteria;
    generate results by searching for data within the collection of datasets;
    determine that the results contain first data from the at least one second lineage level datasets and second data from at least one third lineage level dataset;
    determine that the at least one third lineage level dataset has a second dataset rank that is greater than the first dataset rank;
    and provide the results such that the second data from the at least one third lineage level dataset is before the first data from the at least one second lineage level dataset.

13. The apparatus of claim 11, wherein the collection of datasets includes a plurality of datasets residing in a plurality of physically separate data stores, the physically separate data stores interconnected by a network, and wherein the instructions are further configured to cause the at least one of the one or more processors to:
    determine that the at least one third lineage level dataset has a second dataset rank that is less than the first dataset rank; and optimize network resources to provide greater access to the second lineage level dataset than to the third lineage level dataset.

14. The apparatus of claim 11, wherein the collection of datasets include a third level lineage dataset on a high availability server, and wherein the instructions are further configured to cause the at least one of the one or more processors to:
  determine that the at least one third lineage level dataset has a second dataset rank that is less than the first dataset rank;
  transfer the third lineage level dataset off of the high availability server; and
  transfer the second lineage level dataset to the high availability server.

15. At least one non-transitory computer-readable medium storing computer-readable instructions that, when executed by one or more computing devices, cause at least one of the one or more computing devices to:
  determine a lineage ordering requirement for a collection of datasets;
  determine, from the lineage order requirement, one or more first lineage level datasets from the collection of datasets;
  generate one or more first linage level asset ranks respectively for each one of the one or more first lineage level datasets;
  determine at least one second lineage level dataset having an outflow to the one or more first lineage level datasets;
  generate a first dataset rank for the at least one second lineage level dataset as a first function of the outflow and at least one of the one or more first lineage level asset ranks.

16. The at least one non-transitory computer-readable medium of claim 15, wherein the computer readable instructions are further configured to cause the at least one of the one or more computer devices to:
  receive a search criteria;
  generate results by searching for data within the collection of datasets;
  determine that the results contain first data from the at least one second lineage level datasets and second data from at least one third lineage level dataset;
  determine that the at least one third lineage level dataset has a second dataset rank that is greater than the first dataset rank;
  and provide the results such that the second data from the at least one third lineage level dataset is before the first data from the at least one second lineage level dataset.

17. The at least one non-transitory computer-readable medium of claim 15, wherein the collection of datasets includes a plurality of datasets residing in a plurality of physically separate data stores, the physically separate data stores interconnected by a network, and wherein the computer readable instructions are further configured to cause the at least one of the one or more computer devices to:
  determine that the at least one third lineage level dataset has a second dataset rank that is less than the first dataset rank; and
  optimize network resources to provide greater access to the second lineage level dataset than to the third lineage level dataset.

18. The at least one non-transitory computer-readable medium of claim 15, wherein the collection of datasets include a third level lineage dataset on a high availability server, and wherein the computer readable instructions are further configured to cause the at least one of the one or more computer devices to:
  determine that the at least one third lineage level dataset has a second dataset rank that is less than the first dataset rank;
  transfer the third lineage level dataset off of the high availability server; and
  transfer the second lineage level dataset to the high availability server.

19. The at least one non-transitory computer-readable medium of claim 15, and wherein the computer readable instructions are further configured to cause the at least one of the one or more computer devices to:
  determining that the first dataset rank exceeds a threshold; and
  replicating, responsive to determining the first dataset rank exceeds a threshold, the at least second lineage level dataset.

20. The at least one non-transitory computer-readable medium of claim 15, and wherein the computer readable instructions are further configured to cause the at least one of the one or more computer devices to:
  determine that the first dataset rank exceeds a threshold; and
  apply, responsive to determining the first dataset rank exceeds a threshold, a security policy to the at least one second lineage level dataset.

\* \* \* \* \*